Sept. 22, 1953 J. W. OVERBEKE 2,653,003
CONTROL VALVE
Filed Oct. 26, 1946 2 Sheets-Sheet 1

INVENTOR.
JOHN W. OVERBEKE
BY Richey & Watts
ATTORNEYS

Sept. 22, 1953     J. W. OVERBEKE     2,653,003
CONTROL VALVE
Filed Oct. 26, 1946     2 Sheets-Sheet 2
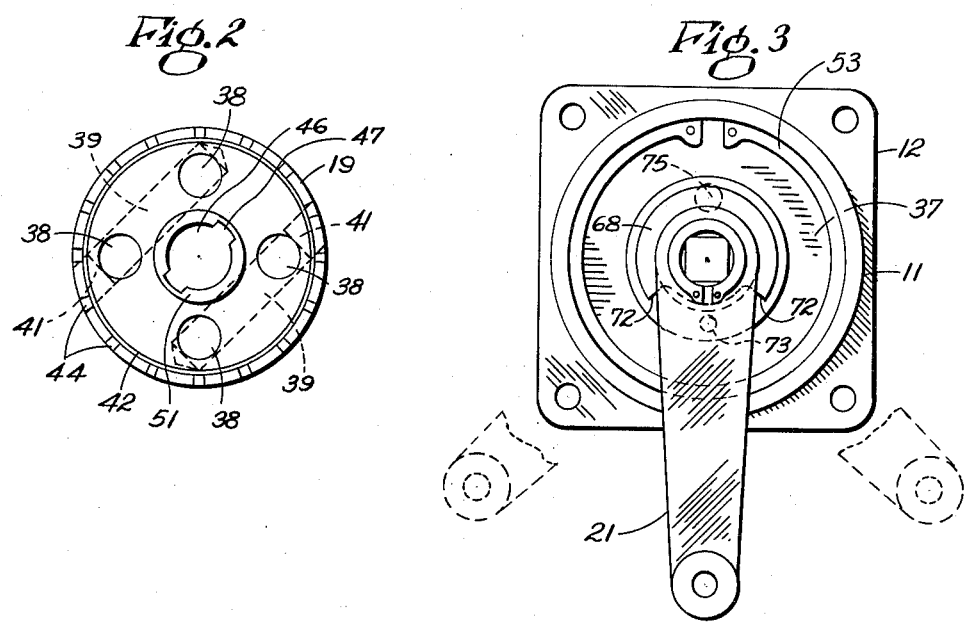
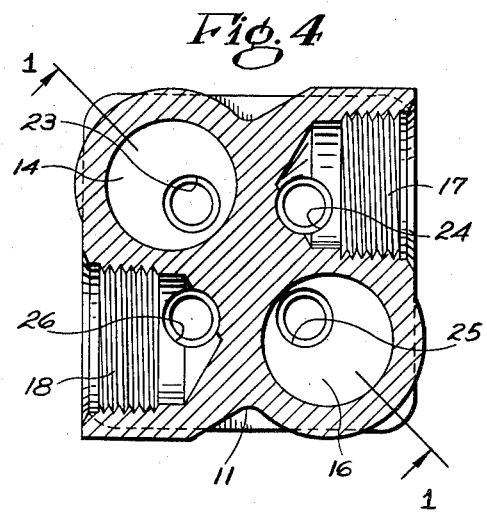
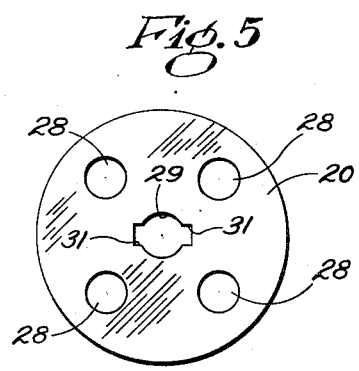
INVENTOR.
JOHN W. OVERBEKE
BY
ATTORNEYS Patented Sept. 22, 1953

2,653,003

UNITED STATES PATENT OFFICE 2,653,003

CONTROL VALVE

John W. Overbeke, Cleveland, Ohio

Application October 26, 1946, Serial No. 705,943

16 Claims. (Cl. 251—87)

This invention relates to a valve particularly adapted to control applications in high pressure fluid systems. Perhaps the most exacting requirements for such valves are found in aircraft installations, where extreme reliability is essential, very high pressures are encountered, and weight and size must be minimized. At present, three thousand (3,000) pounds per square inch is the standard pressure in many airplane installations, and five thousand (5,000) pounds will probably be used as soon as the problems involved can be solved.

The valve of this invention is adapted to reverse the flow of fluid under extreme pressure between a pump and a motor of a hydraulic system. It employs novel features of construction to balance the static forces due to fluid pressure and achieve the proper sealing force between the relatively movable valve parts without undue friction. Thus the valve is easy to operate.

It is an object of the invention to provide a valve in which the fluid pressures on the parts are hydrostatically balanced, which is self-sealing, which is operable with a minimum of effort, and which is compact and light in weight.

Another object is to provide a valve particularly adapted to use in high pressure systems.

A further object is to minimize the expense and effort of fabricating, assembling, and maintaining such a valve.

Other objects and advantages of the invention, more or less ancillary to those stated, will be apparent to those skilled in the art from the description herein of the preferred embodiment of the invention.

Referring to the drawings:

Fig. 2 is a view of the face of the distributor plate;

Fig. 3 is a view of the control handle end of the valve;

Fig. 4 is a cross section taken on the plane indicated by the line 4—4 in Fig. 1; and Fig. 5 is a view of the face of the stationary valve plate.

Figure 1:
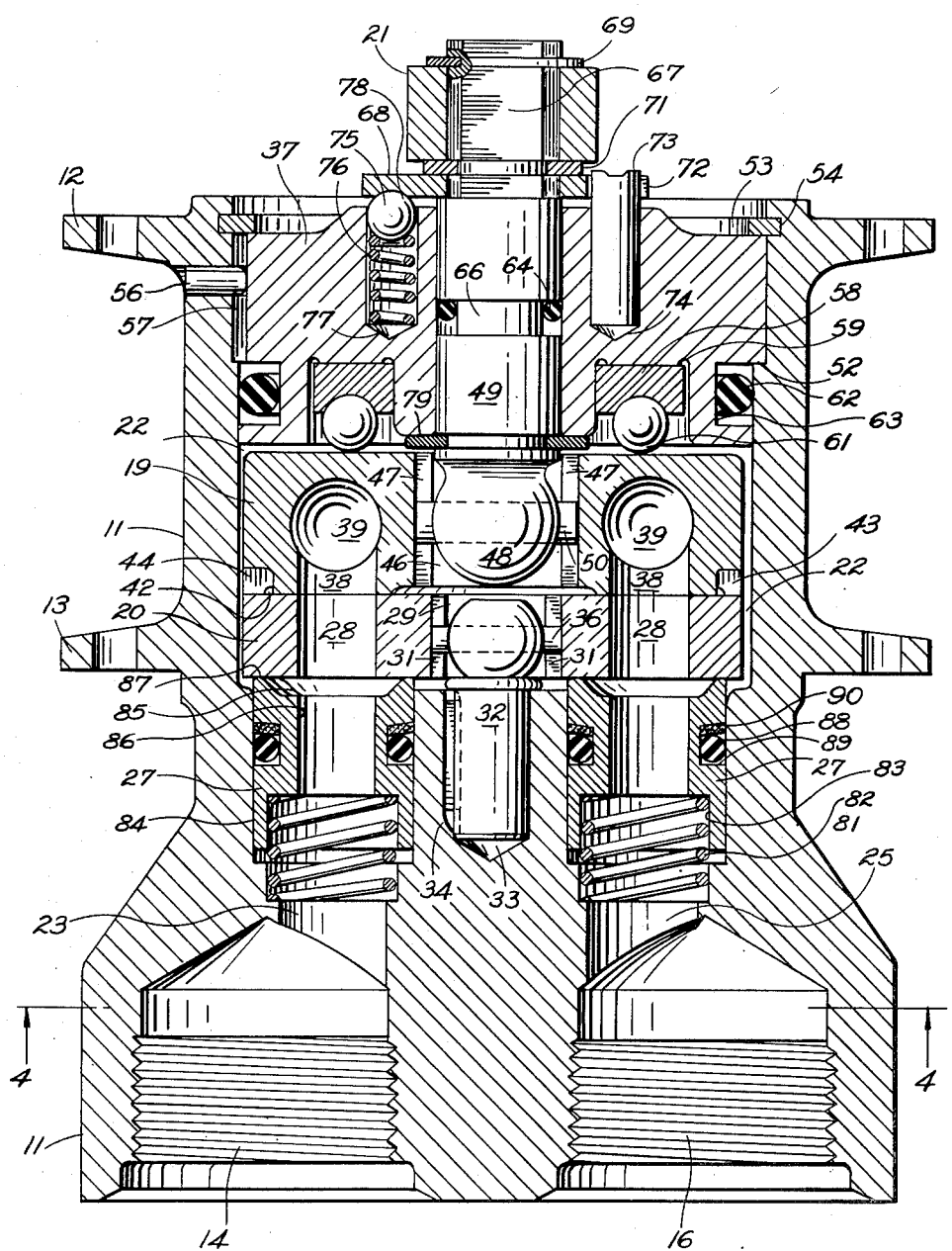
Fig. 1 is an axial section on an enlarged scale, taken on the plane indicated by the line 1—1 in Fig. 4.

The valve is contained in a generally cylindrical shell or casing 11 which may be forged or cast, and is formed with flanges 12 and 13 for mounting on a bulkhead or panel. The lower part of the shell contains the ports for fluid connections (Figs. 1 and 4), which are tapped in the usual manner for the reception of pipe fittings. The pressure port 14 and return port 16 are normally connected to the delivery side of the pump and to the return line to the fluid reservoir, respectively. The two ports 17 and 18 are normally connected to the motor or other controlled device. The function of the valve is to connect either of ports 17 and 18 to the pressure port and the other to the return port, or to isolate all the ports from each other.

This valving is performed by rotation of a distributor plate 19 with respect to a fixed valve plate 20, by means of a hand lever 21 (Fig. 3). The distributor plate and valve plate are installed within a machined cylindrical opening 22 in the upper half of the shell. Fluid is conducted to and from the valve plate 20 through four passages 23, 24, 25, and 26, parallel to the axis of the shell, equally spaced therefrom, and at an angular spacing of ninety degrees (90°). Within an enlarged portion of each passage, there is a sleeve 27 mounted for reciprocative movement therein and supported in spring-pressed engagement with the lower face of the valve plate 20 to prevent the escape of fluid between the contacting surfaces.

The valve plate 20 is a circular disk with four transverse bores 28 therein, each being disposed in aligned relation with one of the passages 23 to 26. The plate 20 is machined with parallel upper and lower surfaces. The disk is formed with a central hole 29 having two opposed splines or keyways 31 therein. A plug 32 fitted in an axial bore 33 in the casing, and held against rotation by a key 34, bears a transverse pin 36 engaged in the splines 31, thus maintaining the bores 28 of the valve plate properly aligned with the fluid passages.

The distributor plate 19, which is disk-shaped, is retained between the valve plate 20 and a cap 37 fixed in the upper part of the casing 11. Four ports 38 disposed for alignment with the ports 28 in the valve plate are bored in the lower surface of the distributor plate. The ports 38 are connected in pairs by passages 39 drilled parallel to the faces of the disk, the open ends of which are closed by plugs 41 brazed or otherwise secured in place. A circular groove 42 adjacent the margin of the lower face of the plate 19 and radial grooves 43 and 44 in the distributor plate are provided to effect the drainage of such fluid as may tend to collect between the valve plates.

The distributor plate is formed with a central bore 46 with opposed splines 47 therein for the reception of the head 48 of the operating shaft 49, the head being fitted with a transverse pin 50 engaged in the splines. The center of the lower face of the plate 19 is relieved at 51 to reduce the contact area against the plate 20.

The end cap 37 is assembled in the chamber 22 with a shouldered portion thereof engaged with a ledge 52 in the wall of the casing, and is retained therein by an expanding snap ring 53 received within a recess 54. A pin 56 pressed into a radial opening in the wall of the casing engages a keyway 57 in the cap to maintain the proper rotational relation of the cap with the casing.

The race 58 of a ball thrust bearing is pressed upon the body of a boss 59 in the lower face of the cap 37, the balls 61 engaging the upper face of the distributor plate. Escape of fluid past the cap is prevented by an O-ring or equivalent seal 62 retained in a circumferential groove 63 in the cap.

The valve operating shaft 49 is journalled in an axial bore in the cap, a seal 64 being fitted in a groove 66 in the shaft. The upper end 67 of the shaft protrudes beyond the face of the cap 37 and is milled with a square shank thereon to receive the hand lever 21 and a detent and stop plate 68, the latter being engaged with the shouldered lower end of the shaft. Spring washers 69 and 71, engaged in grooves in the shaft, retain the hand lever and stop arc in their assembled relation. The stop plate is of arcuate form with a recess in the margin thereof defining abutments 72 which engage a stop pin 73 pressed into a bore 74 in the cap 37. The shoulders 72 limit the movement of the handle to ninety degrees (90°) as indicated in Fig. 3, stopping it in the positions of alignment of the passages 36 with the passages 28. A detent comprising a ball 75 and spring 76, retained in a cavity 77 in the cap, engages depressions 78 in the lower surface of the plate 68 to retain the valve in its open position (with either of the shoulders 72 engaged with the pin 75) and also in an "off" position with the pin intermediate the shoulders. A snap ring 79 retained in a groove in the shaft 49 engages the lower surface of the cap 37 to retain the shaft in the cap.

The provision of the sleeves 27 is an important feature of the invention, which will now be described in detail. The fluid passages 23 to 26 are machined with enlarged bores 81 to receive and support compression springs 82. The upper ends of the springs are retained in counterbores 83 in the sleeves 27, which are formed for a sliding engagement within further diametrically enlarged portions 84 of the fluid passages. The sleeves are machined with counterbores 85 in the upper ends thereof defining ledges circumambient the bore 86 in the sleeve. The faces 87 of the ledges are machined normal to the major axis of the sleeves and lapped for intimate engagement with the stationary valve plate 20 in order to provide a fluid seal between the engaged faces of the sleeve and the valve plate. O-rings 88 or equivalent sealing mechanism are mounted in grooves 89 in the sleeves to prevent fluid loss along the outer surface of the sleeves. The O-rings are preferably mounted for abutting engagement with yieldable washers which are seated in the customary manner upon the tapered end walls 90 of the grooves 89.

The springs 82 are of sufficient strength to retain the valve parts in engaged relation when no fluid pressure is exerted. The thrust of the springs is transmitted through the sleeves 27, valve plate 20, distributor plate 19, thrust bearing 61, end cap 37, and snap ring 53 to the casing 11.

When the valve is connected to pressure lines, hydrostatic forces must be taken care of to prevent leakage and by-passing. The force on the distributor plate 19 is upward, and is received by the ball thrust bearing. The force urging the stationary valve plate 20 against the distributor plate should be as small as is consistent with good operation, to minimize the effort necessary to operate the valve. With the correct amount of force, an oil film will be formed which will lubricate the rotating faces of the plates and form a fluid seal.

The solution of this problem is complicated by the fact that the requisite force depends upon the fluid pressure and also by the fact that the pressure at the different ports is unequal, so that the resultant force is eccentric to the medial axis of the valve.

In this invention, the sleeves 27 are each exposed to the pressure in the corresponding ports, and exert upward forces on the plate 20. Each sleeve will exert a force equal to the product of the fluid pressure and the area of the face 87 of the ledge of the sleeve 27. In addition, the fluid will exert a direct force on the plate 20 equal to the product of the pressure and the difference of the areas of the counter-bore 85 and port 28. The total effect on the plate is therefore determined by the difference between the area of the bore 84 and that of the port 28.

The force exerted directly on the plate 20 by the sleeve 27 serves to maintain the sleeve tightly against the plate and thus seal the abutting faces of the parts. With the construction shown herein, the sealing forces on both faces of the fixed valve plate are proportional to fluid pressure, and the forces are applied where needed. The greatest force is exerted in line with the high pressure ports, and this condition obtains regardless of rotation of the distributor plate from one position to another.

Another advantage of the overall construction of the valve in accordance with the invention is that the parts are organized as a floating assembly, with the result that a minimum of precision machining of parts is required, and strains on the parts are lessened. The universal joint connections between the shaft 49 and the distributor plate, and the valve plate and the casing compensate for misalignment of the end cap or the shaft 49 and any non-parallel relation that exists between the face of the distributor and valve plates. The sleeves 27 are preferably fitted with sufficient clearance in the bores 84 to allow for slight variations in alignment of the plate 20. The mating faces of the distributor plate and the valve plate and the faces 87 of the ledges of the sleeves and lower face of the valve plate should be machined flat and parallel but the other portions of such parts and finished surfaces of the other elements of the assembly need not be finished with precision. If the casing warped slightly with age, the working parts would accommodate themselves to this condition, and neither leakage nor undue wear would occur.

It will be seen that the two principal features of the invention are the manner in which the fluid pressure responsive sleeves are employed to maintain the desired pressure relation between the faces of the valve plates, and the manner in which the valve plates are flexibly mounted. Although these features are illustrated as applied to a rotary valve, they are obviously applicable to valves of other forms, such, for example, as a slide valve.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What I claim is:

1. A valve comprising a casing including fluid passages formed therein, a first valve plate movable in the casing, a second valve plate cooperating with the first valve plate and meeting said first plate at an interface, the plates having cooperative ports opening at the interface and the ports of the second valve plate communicating with the passages in the casing, means for restraining the second valve plate against motion in the plane of the valve plate interface, the said means being adapted to allow the valve plate free movement in the other directions, and means actuated by the pressure of fluid in the valve for continually urging the valve plates into engagement, comprising reciprocable members engaging the second valve plate and having a surface exposed to the fluid.

2. A valve comprising a casing including fluid passages formed therein, a first valve plate movable in the casing, a second valve plate cooperating with the first valve plate and meeting said first plate at an interface, the plates having cooperative ports opening at the interface and the ports of the second valve plate communicating with the passages in the casing, means for restraining the second valve plate against motion in the plane of the valve plate interface, the said means being adapted to allow the valve plate free movement in the other directions, and means actuated into engagement with the second valve plate by the pressure of fluid in the valve for conducting fluid from the casing to the second valve plate, comprising sleeve members in the passages engaging the second valve plate at one end and exposed to fluid at the remaining end.

3. A valve comprising a casing including fluid passages formed therein, a first valve plate movable in the casing, a second valve plate cooperating with the first valve plate and meeting said first plate at an interface, the plates having cooperative ports opening at the interface and the ports of the second valve plate communicating with the passages in the casing, means for restraining the second valve plate against motion in the plane of the valve plate interface, the said means being adapted to allow the valve plate free movement in the other directions, and means actuated by the pressure of fluid in the valve for continually urging the valve plates into engagement and for conducting fluid from the casing to the second valve plate, comprising sleeve members fitted into the passages for fluid-tight engagement therewith, the said sleeve members engaging the second valve plate at one end thereof and being exposed to fluid in the passage at the remaining end, the area of the passages being greater than that of the communicating ports.

4. A valve comprising a casing including fluid passages formed therein, a first valve plate rotatable in the casing, a second valve plate cooperating with the first valve plate and meeting said first plate at an interface, the second valve plate including ports communicating with the fluid passages and the first valve plate including ports disposed to enable interconnection of the ports in the second valve plate, means for restraining the second valve plate against motion in the plane of the valve plate interface, the said means being adapted to allow the valve plate free movement in the other directions, and means actuated into engagement with the second valve plate by the pressure of fluid in the valve for conducting fluid from the casing to the second valve plate, comprising sleeve members in the passages engaging the second valve plate at one end and exposed to fluid at the remaining end.

5. A valve comprising two relatively movable valve parts, the valve parts being formed with mutually mating surfaces with fluid ports therethrough, the ports extending through the first one of the parts and terminating in a surface opposite the mating surface, a body formed with fluid passages therein terminating in aligned relation to the ports in the first valve part, and sleeves reciprocable in the passages engaging the first valve part circumjacent the ports, the effective area of the sleeve subject to pressure of fluid in the passage being greater than the area of a port whereby fluid pressure in the passage counteracts the tendency of fluid pressure in the port to separate the valve parts at the mating surfaces thereof.

6. A valve comprising two relatively movable valve parts, the valve parts being formed with mutually mating surfaces with fluid ports therethrough, the ports extending through the first one of the parts and terminating in a surface opposite the mating surface, a body formed with fluid passages therein terminating in aligned relation to the ports in the first valve part, and sleeves reciprocable in the passages engaging the first valve part circumjacent the ports, the effective area of the sleeve subject to pressure of fluid in the passage being greater than the area of a port whereby fluid pressure in the passage counteracts the tendency of fluid pressure in the port to separate the valve parts at the mating surfaces thereof, and the sleeve being formed with differential areas adapted to be contacted by fluids in the passage whereby fluid pressure maintains the sleeve in sealing engagement with the first valve part.

7. A valve comprising a casing, a fixed valve plate having ports therethrough, a movable valve plate having ports registerable with the ports of the fixed plate, means for retaining the fixed valve plate in the casing adapted to prevent translation of the ports therein but to permit movement of the plate along the axes of the ports to facilitate engagement of the plates; the casing being formed with fluid passages therein registered with the ports of the fixed valve plate, and sleeves in the passages formed with a recessed end the marginal portion of which engages the fixed valve plate circumjacent the ports, whereby fluid pressure in the valve urges the valve plates together and urges the sleeves against the fixed valve plate.

8. A valve comprising a casing, a fixed valve plate having ports therethrough, a movable valve plate having ports registerable with the ports of the fixed plate, means for moving the plate, connecting means between the moving means and the plate, means for retaining the fixed valve plate in the casing adapted to prevent translation of the ports therein but to permit movement of the plate along the axes of the ports to facilitate engagement of the plates, the casing being formed with fluid passages therein registered with the ports of the fixed valve plate, and sleeves in the passages formed with a recessed end the marginal portion of which engages the fixed valve plate circumjacent the ports, whereby fluid pressure in the valve urges the valve plates together and urges the sleeves against the fixed valve plate.

9. A valve comprising a casing, a fixed valve plate having ports therethrough, a movable valve plate having ports registerable with the ports of the fixed plate, means for moving the plate, connecting means between the moving means and the plate, means for retaining the fixed valve plate in the casing adapted to prevent translation of the ports therein but to permit movement of the plate along the axis of the ports to facilitate engagement of the plates, the casing being formed with fluid passages therein registered with the ports of the fixed valve plate, and means responsive to fluid pressure in the valve to urge the valve plates together and to seal against escape of fluid between the casing and the fixed valve plate comprising sleeve members in the passages, the sleeve members having openings for the passage of fluid to the ports of the plates.

10. A valve comprising a casing, a fixed valve plate having ports therethrough, a movable valve plate having ports registerable with the ports of the fixed plate, means for moving the plate, connecting means between the moving means and the plate, means for retaining the fixed valve plate in the casing adapted to prevent translation of the ports therein but to permit movement of the plate along the axes of the ports to facilitate engagement of the plates, the casing being formed with fluid passages therein registered with the ports of the fixed valve plate, and means comprising members reciprocable in the passages and urged by fluid pressure into engagement with the fixed valve plate circumjacent the ports.

11. A valve comprising a body provided with fluid inlet and outlet ducts, a movable valve plate and a stationary valve plate cooperating to control fluid flow between the ducts, the stationary valve plate being formed with passages therethrough, means mounting the stationary plate for freedom of movement normally to the valve plate interface, and sleeves slidable in the ducts engaging the stationary valve plate about the passages to conduct fluid between the ducts and the said valve plate, the ducts being larger than the passages so that fluid pressure urges the valve plates together.

12. A valve comprising a body provided with fluid inlet and outlet ducts, a movable valve plate and a stationary valve plate cooperating to control fluid flow between the ducts, the stationary valve plate being formed with passages therethrough, means mounting the stationary plate for freedom of movement normally to the valve plate interface, and sleeves slidable in the ducts engaging the stationary valve plate about the passages to conduct fluid between the ducts and the said valve plate, the ducts being larger than the passages so that fluid pressure urges the valve plates together, and the sleeves having a larger area exposed to fluid pressure at the duct end than at the plate end, so that fluid pressure urges the sleeves into engagement with the valve plate.

13. A valve comprising a body provided with fluid inlet and outlet ducts, a movable valve plate and a stationary valve plate cooperating to control fluid flow between the ducts, the movable plate being formed with interconnected openings in one face thereof, and the stationary valve plate being formed with through passages alignable with the openings, means mounting the stationary plate for freedom of movement normally to the valve plate interface, and sleeves slidable in the ducts engaging the stationary valve plate about the passages to conduct fluid between the ducts and the said valve plate, the ducts being larger than the passages so that fluid pressure urges the valve plates together.

14. A valve comprising a body provided with fluid inlet and outlet ducts, a movable valve plate and a stationary valve plate cooperating to control fluid flow between the ducts, the movable plate being formed with interconnected openings in one face thereof, and the stationary valve plate being formed with through passages alignable with the openings, means mounting the stationary plate for freedom of movement normally to the valve plate interface, and sleeves slidable in the ducts engaging the stationary valve plate about the passages to conduct fluid between the ducts and the said valve plate, the ducts being larger than the passages so that fluid pressure urges the valve plates together, and the sleeves having a larger area exposed to fluid pressure at the duct end than at the plate end, so that fluid pressure urges the sleeves into engagement with the valve plate.

15. A valve comprising a body provided with fluid inlet and outlet ducts, a movable valve plate and a stationary valve plate cooperating to control fluid flow between the ducts, the stationary valve plate being formed with through passages and the movable plate being formed with interconnected openings in one face thereof alignable with the passages to conduct fluid between the passages through the movable plate, means mounting the stationary plate for freedom of movement normally to the valve plate interface, ducts in the body connected to the chambers, and sleeves slidable in the ducts urged into engagement with the stationary valve plate about the passages to conduct fluid between the ducts and the said valve plate, the ducts being larger than the passages so that fluid pressure urges the valve plates together.

16. A valve comprising a body provided with fluid inlet and outlet ducts, a movable valve plate and a stationary valve plate cooperating to control fluid flow between the ducts, the stationary valve plate being formed with through passages and the movable plate being formed with interconnected openings in one face thereof alignable with the passages to conduct fluid between the passages through the movable plate, means mounting the stationary plate for freedom of movement normally to the valve plate interface, and sleeves slidable in the ducts engaging the stationary valve plate about the passages to conduct fluid between the ducts and the said valve plate, the ducts being larger than the passages so that fluid pressure urges the valve plates together, and the sleeves having a larger area exposed to fluid pressure at the duct end than at the plate end, so that fluid pressure urges the sleeves into engagement with the valve plate.

JOHN W. OVERBEKE.

References Cited in the file of this patent

UNITED STATES PATENTS

| Number | Name | Date |
|---|---|---|
| 841,470 | Turner | June 15, 1907 |
| 1,207,482 | Bloom | Dec. 5, 1916 |
| 1,345,382 | McKibbin | July 6, 1920 |
| 1,486,685 | Reinhardt | Mar. 11, 1924 |
| 1,752,456 | Pillatt | Apr. 1, 1930 |
| 2,191,232 | Heinen | Feb. 20, 1940 |
| 2,192,835 | Leach | Mar. 5, 1940 |
| 2,317,407 | Samiran | Apr. 27, 1943 |
| 2,324,932 | Johnson | July 20, 1943 |
| 2,377,473 | Wolcott | June 5, 1945 |
| 2,380,369 | Nix | July 10, 1945 |

FOREIGN PATENTS

| Number | Country | Date |
|---|---|---|
| 112,873 | Great Britain | of 1941 |